United States Patent [19]

Goulding

[11] Patent Number: 4,741,923

[45] Date of Patent: May 3, 1988

[54] SURFACE TREATMENT FOR RECORDING MEDIA

[75] Inventor: Terence Goulding, Garswood, Nr Wigan, England

[73] Assignee: Imperial Chemical Industries PLC, London, England

[21] Appl. No.: 84,853

[22] Filed: Aug. 13, 1987

[30] Foreign Application Priority Data

Aug. 21, 1986 [GB] United Kingdom ............... 8620337
Oct. 7, 1986 [GB] United Kingdom ............... 8624022

[51] Int. Cl.$^4$ ............................................ H01F 10/02
[52] U.S. Cl. .................................. 427/130; 427/131; 427/132; 427/335; 427/343; 427/377
[58] Field of Search ............................. 427/130–132, 427/335, 343, 377

Primary Examiner—Bernard D. Pianalto
Attorney, Agent, or Firm—Cushman, Darby & Cushman

[57] ABSTRACT

A method for improving the abrasion resistance of the (cobalt) recording layer of a video tape which comprises applying a (strong) hydrogen peroxide solution to the surface and quickly removing the solution prior to the onset of disintegration of the recording layer.

10 Claims, No Drawings

SURFACE TREATMENT FOR RECORDING MEDIA

The invention relates to surface treatment of magnetic recording materials and particularly to a method for treating the surface of an electroless plated ferromagnetic recording layer to enhance the abrasion resistance of the layer.

Video tapes, i.e. tapes carrying a layer of magnetic recording medium used for recording and playing back electromagnetic signals used to drive a television set or TV monitor, require considerable abrasion resistance if they are not to be damaged during use. In use, the tapes are held against a rapidly rotating recording head, and where resistance to abrasion is inadequate, parts of the recording layer can be abraded away very rapidly by the head. Abrasion damage is especially likely to occur during playback of still frames where the tape is stationary so that the head is rotated against the same portion of tape during the period of playback.

It has been proposed to apply a protective layer over the recording layer. However, it is important for efficient recording that the distance between the head and the recording medium be minimised, and this prevents the use of substantial protective layers overlying the recording medium, as such layers would necessarily come between the recording medium and the head.

The present invention is directed towards providing alternative means for improving the abrasion resistance of recording media by chemical treatment, and is particularly applicable to video tapes because of the abrasive environment in which such tapes are used. The treatment is not limited by the type of substrate supporting the recording layer, and the invention is equally applicable whether the recording medium overlies a tape or any other supporting material which is inert to the chemicals used in the treatment.

Most commercial video tapes at the present time have recording layers comprising metal oxides although a recent introduction is tapes in which the recording layer comprises a ferromagnetic metal, such as cobalt, evaporated onto one surface of a prestretched polymer tape, often with an adhesion-promoting layer between the polymer tape and the recording layer. The metals can, however, be deposited onto the tape by methods other than evaporation, although the nature of the metal particles in the recording layer and their structures are determined initially by their manner of deposition and the physical and chemical properties of metal layers formed in different ways may differ considerably. A recent and particularly economical method of depositing metals to form layers of high magnetic performance, is that of electroless plating (EP), in which the metal is chemically deposited from (usually aqueous) solutions of precursor compounds. Such depositions are particularly prone to abrasion damage unless suitably treated.

Particles deposited by EP exhibit chemical properties different from those of evaporated metal layers, as shown for example by their behaviour towards solutions containing hydrogen peroxide. It has been proposed to improve the corrosion resistance of evaporated cobalt films by treatment of the films with dilute aqueous solutions of EDTA, hydrogen peroxide and sodium hydroxide for several, say 10–20 minutes. When such solutions are applied to EP metal layers under similar conditions, we have found that the treatment quickly destroys the metal layer. The problem, we found, was the hydrogen peroxide. If EP tape is immersed in a strong aqueous solution of hydrogen peroxide, at ambient temperatures, the cobalt coating is destroyed within seconds. After a very short period of time, the cobalt layer starts to discolour, going to a brown shade, and then very quickly breaks up. Microscopic observation revealed that at the onset of disclouration, a number of tiny holes appear in the cobalt layer, these holes expanding rapidly as the layer starts visibly to disintegrate. This rapid disintegration of the layer can be observed even with quite dilute hydrogen peroxide solutions, e.g. with the 0.5% aqueous solution of hydrogen peroxide containing EDTA and sodium hydroxide referred to above.

We have found that these solutions of hydrogen peroxide which cause EP metal layers to disintegrate so rapidly, initially produce a metal layer which is much more resistant to abrasion than the untreated layer.

According to the invention there is provided a method for enhancing abrasion resistance of a ferromagnetic recording media characterised in that the recording medium comprises a layer of electroless plated ferromagnetic material susceptable to disintegration by hydrogen peroxide, and in that the layer is treated with hydrogen peroxide with the treatment terminated prior to the onset of noticeable disintegration of the recording layer.

A preferred method for so treating the surface of an electroless plated ferromagnetic recording layer comprises applying a solution of hydrogen peroxide to the surface and removing the hydrogen peroxide from the treated surface prior to the onset of noticeable disintegration of the recording layer.

The maximum period of time during which hydrogen peroxide can be permitted to remain in contact with the recording layer will depend upon the strength of the hydrogen peroxide solution, being in general less the stronger the solution, but normally will be less than 30 seconds and preferably is no more than about 10 seconds. As a guide we prefer, especially when using strong e.g. 20–30% by volume hydrogen peroxide solutions, to terminate contact of the solution with the recording layer within about 10 seconds after application of the solution.

Another parameter affecting the treatment of the recording layer with the hydrogen peroxide is the amount of hydrogen peroxide and thus the thickness of the layer of peroxide solution applied to the recording layer. Removal of the solution is conveniently by evaporation so that thicker layers of solution take longer to remove than do thinner layers. We prefer to employ very thin layers of solution which in addition to being removable quickly have the advantage of restricting the amount of hydrogen peroxide to a low level at which there may be insufficient peroxide present to cause any noticeable discolouration/disintegration of the recording layer. In this event the hydrogen peroxide is removed by reaction with the recording medium so that there is less need for rapid drying of the recording layer, but in practice we prefer both to use a very thin film of peroxide solution and to dry the recording layer quickly, for example within about 10 seconds.

In the preferred technique the thickness of the layer of peroxide solution applied over the recording layer is a few, for example 2 or 3, $\mu$m and such a thin layer can be applied by wiping the surface of the recording layer, which itself is usually about 0.1 $\mu$m thick, with a tissue or sponge impregnated with peroxide solution. Alternatively, very thin layers of solution can be applied by a variety of well-known techniques such as spraying, brushing, doctoring, kissing and roller-coating. These techniques can also be used to apply thicker layers of solution, for instance up to about 10 μm, as also can simple dipping techniques.

In many cases, especially where very thin layers of peroxide solution are employed, the solution can be allowed to evaporate from the recording layer at ambient temperature and without blowing air or another fluid over the surface. Blowing, optionally using warm, dry air is a useful aid to rapid removal of thicker layers of peroxide solution and if desired the recording tape may be heated directly. Any temperature may be employed at which the recording layer and its support remain undamaged, for example up to about 80° C.

The hydrogen peroxide solution will normally be an aqueous solution and in general will be a strong solution of 20–30% by volume, or higher, peroxide. However, more dilute solutions can be used although we prefer a solution strength greater than 1% by volume and especially greater than 5%. The solution may contain additives dissolved, dispersed or emulsified therein which may remain deposited on the recording layer when the solution is removed by evaporation. Examples of useful additives are EDTA, peroxide activators and lubricants such as long-chain fatty acids, e.g. stearic acid.

As an alternative to applying the hydrogen peroxide as a solution, abrasion resistance can also be improved by treating the EP-coating with hydrogen peroxide vapour. This can be achieved in simple manner by suspending the tape above a strong aqueous solution of hydrogen peroxide maintained at elevated temperatures. Using 30% w/v solutions at 80° C. we found it was necessary to treat the film for much longer periods than could be used when applying the solution direct, e.g. up to at least 10 minutes, but provided the surface was kept dry and free from condensation there appeared to be less danger of disintegration of the coating when using this method. Thus a preferred vapour treatment, is one in which the EP-coated film is heated to a temperature at least as high as the temperature of the vapour before being brought into contact with that vapour.

The process of the invention is applicable to recording layers comprising any ferromagnetic material but is especially applicable to layers comprising cobalt which may be essentially cobalt (i.e. may contain up to a few percent of other elements, e.g. phophorus), an alloy of cobalt or a mixture of cobalt with another metal for example nickel.

The invention is illustrated by the following examples.

EXAMPLE 1

Lengths of coated polyester suitable for making up into video tape and comprising a polyester support tape EP-coated with a cobalt recording layer were placed with the recording layer uppermost on a flat glass plate of size 10×15×0.4 cm and secured with adhesive tape.

Pads of paper tissues soaked in 30% w/v hydrogen peroxide solution (aqueous) were wiped over the surface of the samples to provide a layer of the solution of thickness approximately 2 microns. The solution was immediately allowed to evaporate from the surface of the sample at ambient temperature.

The abrasion resistance of the surface, i.e. the surface of the cobalt recording layer was determined by means of a scrubbing test on an REL Abrasion Test Equipment commonly used to evaluate paint films. The equipment comprises six arms which move to and fro over the tape surface. Each arm was loaded with a 500 g weight and provided with a pad of paper tissue in contact with the surface of the recording layer. The number of scrubs, i.e. the number of times the pad moves over the surface, is counted on a counter; the test was ceased after 5,000 scrubs.

It was observed in a series of abrasion tests that after 5,000 scrubs the samples exhibited visible evidence of a few light surface scratches. In all samples removal of cobalt from the surface of the recording layer was only slight.

EXAMPLE 2

Using the procedure described in Example 1, samples of EP-coated polyester tape were each coated by wiping with a 30% w/v aqueous hydrogen peroxide solution to provide a 2 μm thick layer of the solution. The solution was immediately allowed to evaporate from the surface at ambient temperature. The samples were then coated by wiping with a 0.2% w/v solution of lauroyl peroxide in isopropyl alcohol to provide a 2 micron thick layer of the solution. The isopropyl alcohol was allowed to evaporate at ambient temperature.

The resulting samples were subjected to the abrasion test with the result that after 7,000 scrubs the surface of the cobalt recording layer was barely damaged and hardly any removal of cobalt had occurred.

EXAMPLE 3

Further samples of the same EP-coated tape were treated by exposure to hydrogen peroxide vapour, i.e. to the vapour above a solution of hydrogen peroxide at elevated temperatures. The solution was an aqueous 30% w/v hydrogen peroxide solution maintained at a temperature of about 80° C. throughout the treatment, and the tape samples were suspended above the solution for various periods, typically 2–10 minutes, after which time they were tested as described in Example 1. To keep their coated surfaces free from condensation during the treatment, the samples were all preheated to 80° C. before being suspended above the solution.

Although the treatment periods included periods very much longer than could be withstood by the coating under the conditions of Example 1, no noticeable disintegration occurred, but the improvement in abrasion resistance achieved, especially with those samples which were left suspended for the longer periods, was very similar to that achieved in Example 1. Samples of the EP-coated tape treated as above for periods of about 10 minutes, survived 5000 scrubs of the abrasion test machine with hardly any of the cobalt visibly having been removed.

COMPARATIVE EXAMPLES

For purposes of comparison the abrasion test was performed on samples of the untreated EP-coated polyester tape. In this case the test was ceased after 200 scrubs. It was observed that the cobalt recording layer was quickly removed leaving bare patches and that after 200 scrubs (and in some cases after only 100 scrubs) virtually all of the cobalt had been removed.

Again for purposes of comparison a sample of the EP-coated polyester tape was subjected to the treatment hitherto proposed for evaporated cobalt tapes, i.e. immersion for 10–20 minutes in a 0.5% solution of hydrogen peroxide containing EDTA and sodium hydroxide. It was observed that the cobalt recording layer rapidly became discoloured and within a few minutes had completely disintegrated.

I claim:

1. A method for enhancing abrasion resistance of a ferromagnetic recording medium characterised in that the recording medium comprises a layer of electroless plated ferromagnetic material susceptable to disintegration by hydrogen peroxide, and in that the layer is treated with hydrogen peroxide with the treatment terminated prior to the onset of noticeable disintegration of the recording layer.

2. A method as claimed in claim 1, which comprises applying a solution of hydrogen peroxide to the surface of the ferromagnetic material and removing the hydrogen peroxide from the treated surface prior to the onset of noticeable disintegration of the recording layer.

3. A method as claimed in claim 2 wherein the solution is an aqueous solution containing more than 1% by weight of hydrogen peroxide.

4. A method as claimed in claim 3 wherein the solution contains 20–30% by volume of hydrogen peroxide.

5. A method as claimed in any one of claim 2 wherein contact of the ferromagnetic material with the solution is terminated within 10 seconds after aplication of the solution.

6. A method as claimed in claim 5 wherein the contact is effected by blowing warm dry air over the surface of the ferromagnetic layer, while maintaining the layer at a similar elevated temperature.

7. A method as claimed in any one of claim 6 wherein the hydrogen peroxide solution is applplied to the surface of the ferromagentic material as a thin layer 2–10 $\mu$m thick.

8. A method as claimed in claim 1 wherein the ferromagnetic material is treated with hydrogen peroxide vapour.

9. A method as claimed in claim 1 wherein the recording medium is suspended above a strong aqueous solution of hydrogen peroxide maintained at an elevated temperature, thereby to contact hydrogen peroxide vapour, and the recording medium is heated to a temperature at least as high as that of the vapour before being brought into contact with it.

10. A method as claimed in claim 2 in which the ferromagnetic material is essentially cobalt, an alloy of cobalt or a mixture of cobalt with another metal.

* * * * *